United States Patent
Horie et al.

(10) Patent No.: US 6,984,911 B2
(45) Date of Patent: Jan. 10, 2006

(54) ROTARY ELECTRIC MACHINE STATOR

(75) Inventors: Tatsuro Horie, Utsunomiya (JP); Kenji Fukuda, Shioya-gun (JP); Manabu Kobayashi, Utsunomiya (JP)

(73) Assignee: Honda Motor Co., Ltd., Toyko (JP)

( * ) Notice: Subject to any disclaimer, the term of this patent is extended or adjusted under 35 U.S.C. 154(b) by 3 days.

(21) Appl. No.: 10/488,177

(22) PCT Filed: Sep. 3, 2002

(86) PCT No.: PCT/JP02/08932

§ 371 (c)(1),
(2), (4) Date: Mar. 1, 2004

(87) PCT Pub. No.: WO03/021744

PCT Pub. Date: Mar. 13, 2003

(65) Prior Publication Data

US 2004/0245882 A1 Dec. 9, 2004

(30) Foreign Application Priority Data

Sep. 3, 2001 (JP) .............................. 2001-266344

(51) Int. Cl.
H02K 3/34 (2006.01)
(52) U.S. Cl. ..................................... 310/194
(58) Field of Classification Search ................ 310/194, 310/216–218, 254
See application file for complete search history.

(56) References Cited

U.S. PATENT DOCUMENTS 3,339,097 A * 8/1967 Dunn .......................... 310/194
4,818,911 A * 4/1989 Taguchi et al. ............. 310/259
5,698,923 A * 12/1997 Scherzinger et al. ........ 310/194
5,780,951 A * 7/1998 Stephens ..................... 310/172
5,969,455 A * 10/1999 Sakamoto .................... 310/194

FOREIGN PATENT DOCUMENTS

| CN | 1145544 A | 3/1997 |
|---|---|---|
| EP | 0748025 | 12/1996 |
| JP | 58-201553 | 11/1983 |
| JP | 58-201565 | 11/1983 |
| JP | 63-4144 | 1/1988 |
| JP | 9-56099 | 2/1997 |
| JP | 9-308142 | 11/1997 |
| JP | 2000-32694 | 1/2000 |
| JP | 2000-50556 | 2/2000 |
| JP | 2001-25187 | 1/2001 |
| JP | 2001-25198 | 1/2001 |
| JP | 2002-233091 | 8/2002 |

* cited by examiner

Primary Examiner—Tran Nguyen
(74) Attorney, Agent, or Firm—Westman, Hattori, Daniels & Adrian, LLP

(57) ABSTRACT

A stator for use in a rotating electrical machine is constituted by arranging the prescribed number of stator units in the circumferential direction of a stator core having a circular ring shape. The stator units provide magnetic teeth that project inwardly in the radial direction of the stator core. Coils are wound about the magnetic teeth via insulating members. Each of the insulating members arranges thick portions that slightly project opposite to each other in the width direction of the magnetic tooth, wherein the thick portions are shifted in positions in the thickness direction of the stator core with respect to opposite sides of the magnetic teeth arranged opposite to each other. Thus, it is possible to noticeably improve the space factor in the stator.

8 Claims, 6 Drawing Sheets

ROTARY ELECTRIC MACHINE STATOR

TECHNICAL FIELD

This invention relates to stators for use in rotating electrical machines such as motors and generators.

BACKGROUND ART

A typical example of a stator for use in a rotating electrical machine such as a motor and a generator is disclosed in Japanese Unexamined Patent Publication No. 2001-25187, wherein the stator comprises a stator core having a circular ring shape, coils wound about magnetic teeth, and insulating members. Herein, the stator core corresponds to a lamination or stacking of magnetic steel sheets, from which a prescribed number of magnetic teeth project inwardly in the radial direction of the stator. The coils are wound about the magnetic teeth that are arranged in the circumferential direction of the stator, and the insulating members, each having a cylinder-like shape, are arranged to cover the magnetic teeth and are also arranged being sandwiched between the magnetic teeth and coils.

FIG. 5 shows a partial structure of a stator 30 in which the prescribed number of stator units 32 are arranged and assembled together in a circumferential direction with respect to magnetic teeth 31 respectively. FIG. 6 shows an exploded perspective view showing an assembly of each stator unit 32, which comprises a core unit 34 accompanied with an insulating member 37 consisting of a pair of insulating elements 35 and 36. Herein, the core unit 34 laminates plural magnetic steel sheets 33 to form a single magnetic tooth 34. The insulating elements 35 and 36 each having a square U-shape in section are assembled together with the core unit 34 from both sides, so that the core unit 34 is assembled together with the insulating member 37 having a cylinder-like shape, which covers the magnetic tooth 31. Then, a coil 38 is wound about the insulating member 37 as shown in FIG. 7.

In the above, a pair of the insulating elements 35 and 36 are connected together in such a way that they are mutually engaged with each other at the approximately center position in the stacking direction of the magnetic steel sheets forming the magnetic tooth 31, thus forming the insulating member 37 having a closed square cylinder shape. Prescribed dimensions are set to each of the insulating elements 35 and 36 to realize the least minimal thickness in consideration of strength and insulation. Therefore, prescribed dimensions are set to each of engagement portions 39a and 39b, which correspond to tip ends of the insulating elements 35 and 36, to realize the least minimal thickness. For this reason, under the engaged state of the insulating member 37, overlapping areas between the insulating elements 35 and 36 that are engaged with each other by the engagement portions 39a and 39b should be inevitably increased in thickness. Hence, the insulating members 37 substantially having the uniform thickness are arranged entirely with respect to outer surfaces of the magnetic teeth 31, which meet arrangements of the engagement portions 39a and 39b.

Since the aforementioned stator units 32 arrange the insulating members 37 each having a square cylinder shape, the coils 38 wound about the exteriors of the insulating members 37 should be bent with small radiuses of curvature at every corner of the insulating members 37, while they may be wired substantially straight along with 'flat' surfaces of the insulating members 37 between corners.

Actually, however, due to the elasticity of the coil 38, the coil 38 may be partially separated from the flat surfaces of the insulating member 37 between corners. Therefore, the coil would not be tightly attached to the surfaces of the insulating member 37 between corners. That is, the coil 38 is greatly curved with a relatively large radius of curvature in such a way that it separates from the surface of the insulating member 37 at the approximately center position between adjacent corners.

The aforementioned phenomena that occurs in each stator unit 32 is shown in FIG. 7, wherein the coil 38 may be loosely wound about the insulating member 37 encompassing the magnetic tooth 31 in such a way that it would be greatly increased in dimensions in appearance in both the width and longitudinal direction of the core of the magnetic tooth 31 in proximity to the center position of the flat surface of the insulating member 37 between adjacent corners.

When the stator 30 is constituted by arranging the prescribed number of the aforementioned stator cores 32 in the circumferential direction thereof, the coils 38 must be greatly expanded outwardly in proximity to the center positions in the longitudinal direction of the core of the magnetic teeth 31, i.e., in the stacking directions of the magnetic steel sheets. This minimizes intervals of distance measured between adjoining stator units 32 at the center positions; in other words, minimal gaps are formed between adjoining stator units 32 at the center positions.

That is, even though sufficiently large intervals of distance are arranged between adjoining stator units 32, a bottleneck occurs due to the minimal gaps between adjoining stator units 32 at the center positions in the longitudinal direction of the core of the magnetic teeth 31. This causes difficulties in winding the coils 38 in further lengths about the insulating members 37 of the stator units 32. In addition, there is a problem in that intervals of distance between the magnetic teeth 31 cannot be reduced further.

It is an object of this invention to provide a stator that can increase numbers of turns of coils wound about stator units without changing dimensions regarding magnetic teeth, coil diameters, and the like, thus improving space factors of coils. In addition, it is another object of this invention to reduce intervals of distance between magnetic teeth without decreasing the numbers of turns of coils wound about stator units.

DISCLOSURE OF INVENTION

A stator for use in a rotating electrical machine is constituted by arranging the prescribed number of stator units in the circumferential direction of a stator core having a circular ring shape. The stator units provide magnetic teeth that project inwardly in the radial direction of the stator core. Coils are wound about the magnetic teeth via insulating members. Each of the insulating members has thick portions that slightly project opposite to each other in the circumferential direction of the magnetic tooth, so that one thick portion formed on one insulating member is shifted in position compared with the other thick portion formed on the other adjoining insulating member. Thus, it is possible to improve the space factor in the stator, wherein the coils can be increased in numbers of turns, or the gaps between the magnetic teeth can be reduced without reducing the numbers of turns of the coils. This guarantees noticeable improvement of the torque or electric power generation, or this may realize downsizing of the machine without causing unwanted reduction of power.

In the above, the coils are asymmetrically wound about the magnetic teeth adjoining together in such a way that an outline of one coil wound about one magnetic tooth is complementary to an outline of the other coil wound about the other magnetic tooth with respect to the opposite sides of the insulating members.

Each of the insulating members consists of a pair of insulating elements each having roughly a square U-shape in section. Specifically, each insulating element is formed by a base portion covering a terminal surface of the magnetic tooth, and a pair of interconnection plates having mutually different lengths, so that when the pair of insulating elements are combined together, tip portions of the interconnection plates of the insulating elements oppositely arranged engage with each other to form thick portions that are arranged opposite to each other in the radial direction of the stator core with respect to the opposite side portions of the insulating member. Alternatively, each insulating member consists of a pair of a first insulating element and a second insulating element each having roughly a square U-shape in section, wherein the first insulating element has a pair of interconnection plates each having a first length, and the second insulating element has a pair of interconnection plates each having a second length that is shorter than the first length. When these insulating elements are combined together, tip portions of the interconnection plates of the first and second insulating elements oppositely arranged engage with each other to form thick portions that are arranged in the opposite side portions of the insulating member.

BEST MODE FOR CARRYING OUT THE INVENTION

This invention will be described in further detail by way of examples with reference to the accompanying drawings.

Figure 1:
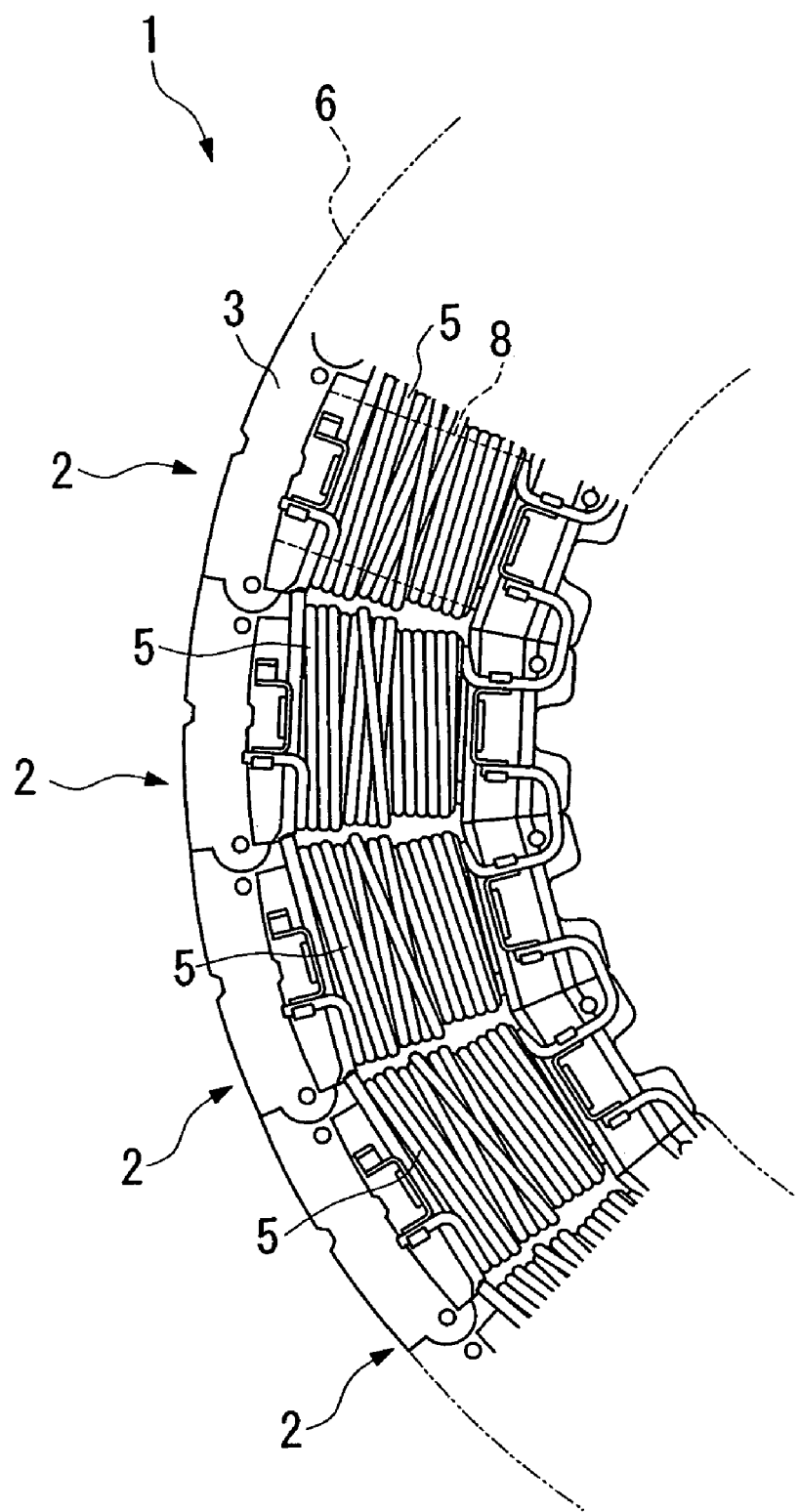
FIG. 1 is a plan view showing selected parts of a stator in accordance with a first embodiment of the invention.
Figure 2:
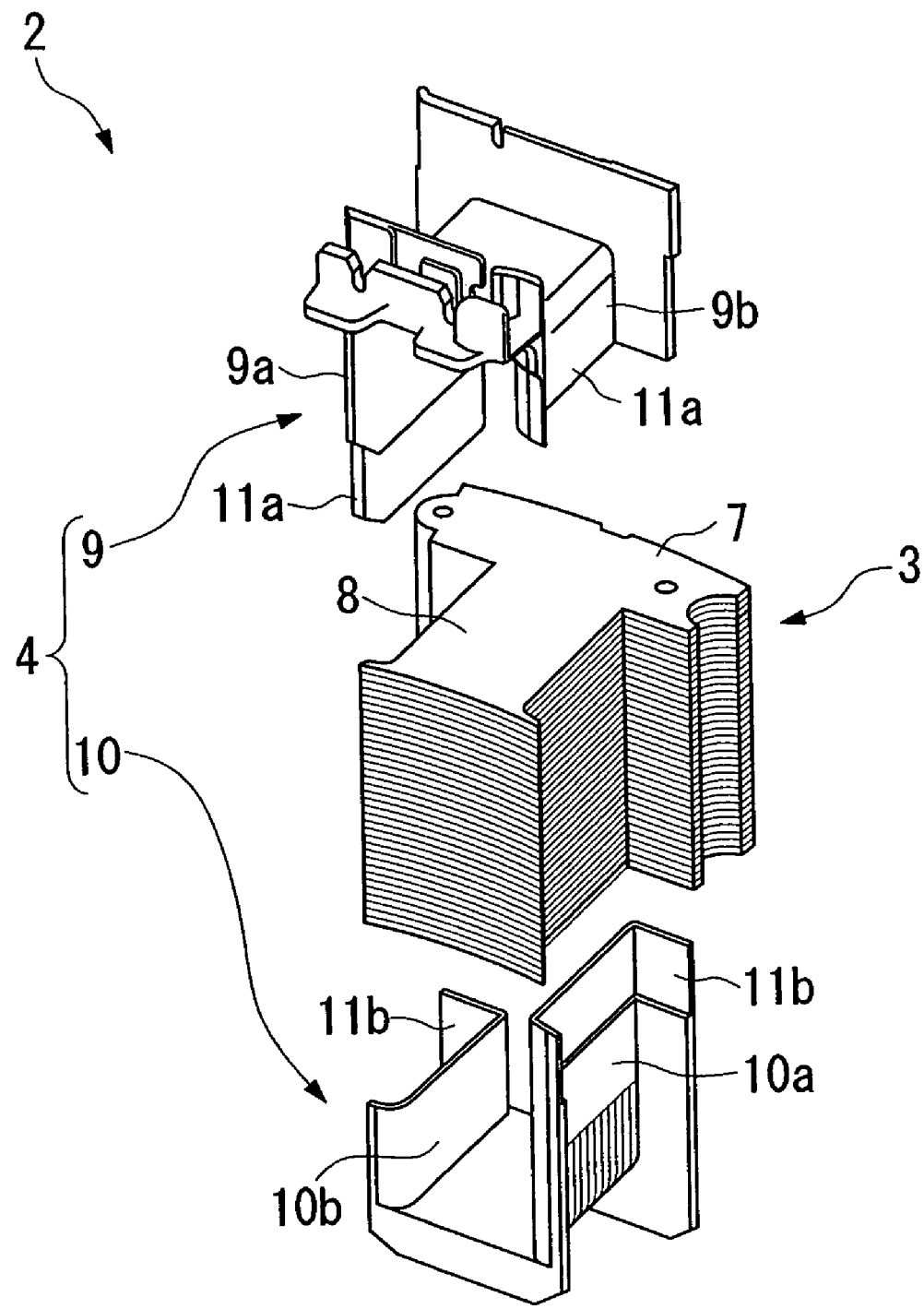
FIG. 2 is an exploded perspective view showing an assembly of a stator unit.
Figure 5:
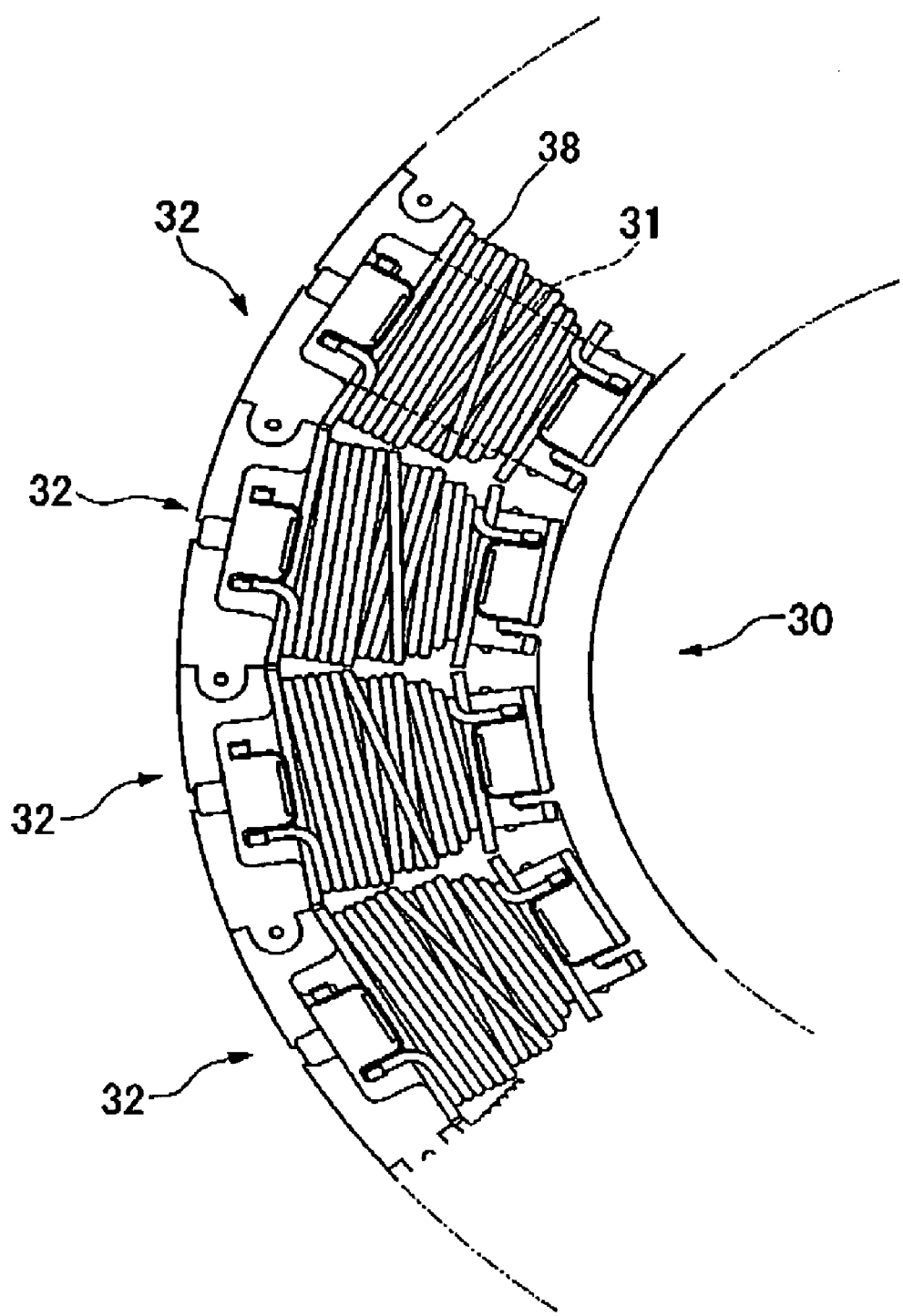
FIG. 5 is a plan view showing selected parts of a stator for use in a rotating electrical machine.

FIG. 1 shows selected parts of a stator 1 in accordance with the first embodiment of the invention, wherein as similar to the conventional stator 30 shown in FIG. 5, the stator 1 of the first embodiment has a circular ring shape and is constituted by arranging the prescribed number of stator units 2 in the circumferential direction thereof. FIG. 2 shows an exploded perspective view showing an assembly of each stator unit 2, which comprises a core unit 3, an insulating member 4, and a coil 5. The prescribed number of core units 3 are arranged in the circumferential direction to form a stator core 6 having a circular ring shape.

Figure 6:
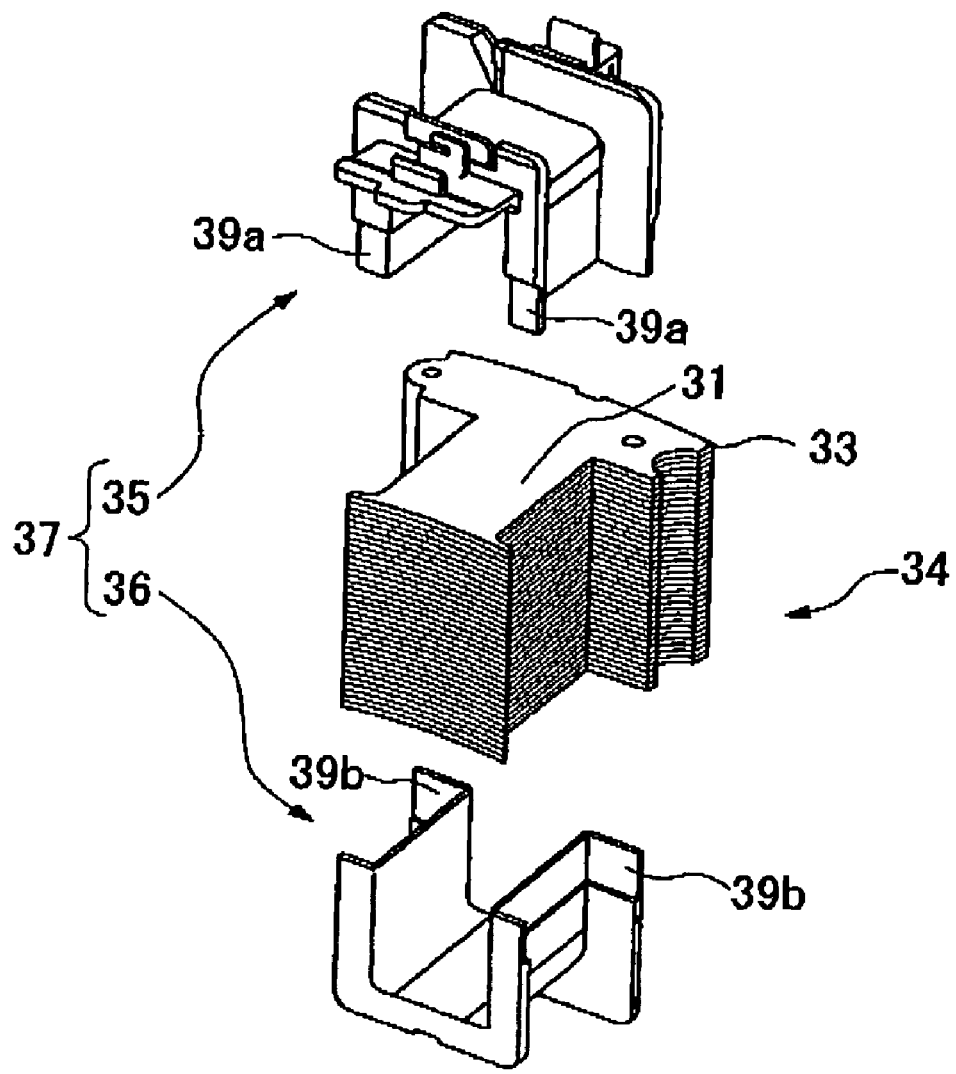
FIG. 6 is an exploded perspective view showing an assembly of a stator unit.
Figure 7:
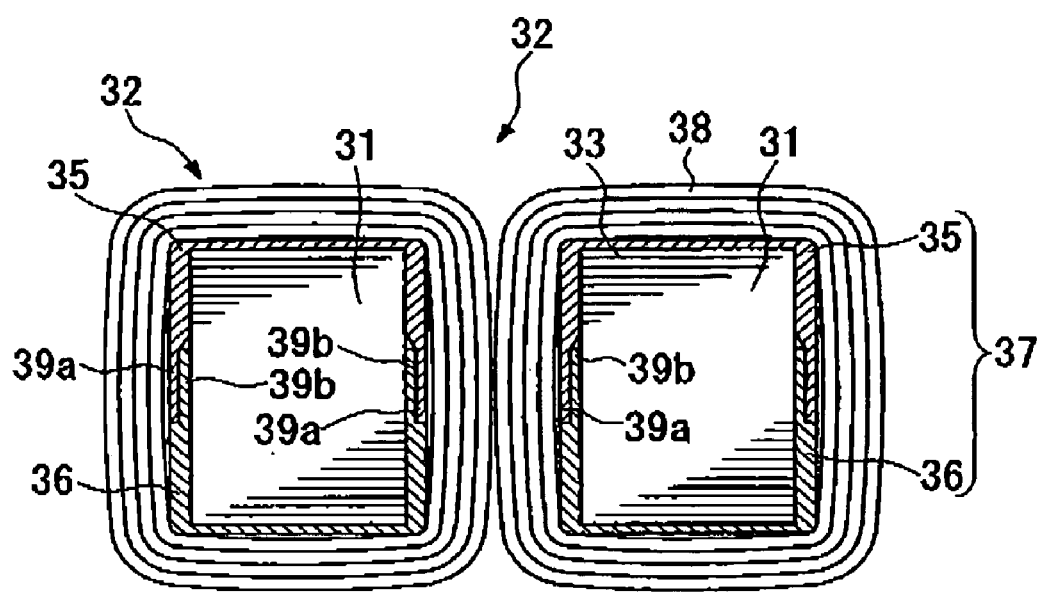
FIG. 7 is a sectional view diagrammatically showing adjoining stator units about which coils are respectively wound.

The stator unit 2 of the present embodiment is constituted similar to the foregoing stator unit 32 shown in FIG. 6. That is, the core unit 3 corresponds to a lamination or stacking of plural magnetic steel sheets 7, which provides a magnetic tooth 8. The insulating member 4 having a cylinder-like shape consists of a pair of insulating elements 9 and 10 each having roughly a square U-shape in section. These insulating elements 9 and 10 are assembled together in proximity to each other with the core unit 3 in both sides of the accumulating direction of the magnetic steel sheets 7. Then, the coil 5 is wound about the insulating member 4, thus completely producing a single stator unit 2 that is similar to the foregoing stator unit 32.

Specifically, the stator 1 of the present embodiment clearly differs from the foregoing stator 30 with respect to the structure of the insulating member 4 and the coil 5 wound about the insulating member 4 in the stator unit 2.

Each of the insulating elements 9 and 10 comprises a side portion B for covering the side surface of the magnetic tooth 8 and a base portion A for covering the terminal surface of the magnetic tooth 8. Specifically, the insulating element 9 comprises interconnection plates 9a and 9b whose tip ends are connected with engagement portions 11a. In addition, the insulating element 10 comprises interconnection plates 10a and 10b whose tip ends are connected with engagement portions 11b. Herein, first interconnection plates 9a and 10a differ from the second interconnection plates 9b and 10b in lengths, which may be similar to the foregoing insulating elements 35 and 36 including elements 39a and 39b that differ from each other in lengths (see FIG. 6). Unlike the foregoing insulating elements 35 and 36, the insulating elements 9 and 10 employs taper structures for the interconnection plates 9a and 9b and for the interconnection plates 10a and 10b (see FIG. 3), wherein the thickness is gradually reduced in the direction from the proximate areas of the engagement portions 11a to the base portion A of the insulating member 9, and the thickness is gradually reduced in the direction from the proximate areas of the engagement portions 1b to the base portion A of the insulating member 10.

Like the foregoing engagement portions 39a and 39b of the insulating elements 35 and 36 shown in FIG. 6, the engagement portions 11a and 11b of the insulating elements 9 and 10 are mutually and partially overlapped together, thus realizing the least minimal thickness that is required in consideration of the strength and insulation. Thus, the stator unit 2 provides thick portions (or interconnection portions) 12 that are greatly increased in thickness compared with the other portions.

In each stator unit 2 (see FIG. 3), the insulating member 4 has side portions B that are opposite to each other in the circumferential direction of the magnetic tooth 8 as well as terminal portions A that are opposite to each other in the longitudinal direction of the core of the magnetic tooth 8. Herein, the stator units 2 are arranged to adjoin together the side portions B of the insulating members 4 thereof. In one side portion B, the engagement portions 11a and 11b engage with each other at the upper position that is above the center position in the stacking direction of the magnetic steel sheets 7 forming the magnetic tooth 8. The thick portion 12 is arranged at this position and slightly projects from one side surface of the magnetic tooth 8. In the other side portion B, the engagement portions 11a and 11b engage with each other at the lower position that is below the center position in the stacking direction of the magnetic steel sheets 7 forming the magnetic tooth 8. The other thick portion 12 is arranged at this position and slightly projects from the other side surface of the magnetic tooth 8.

Figure 3:
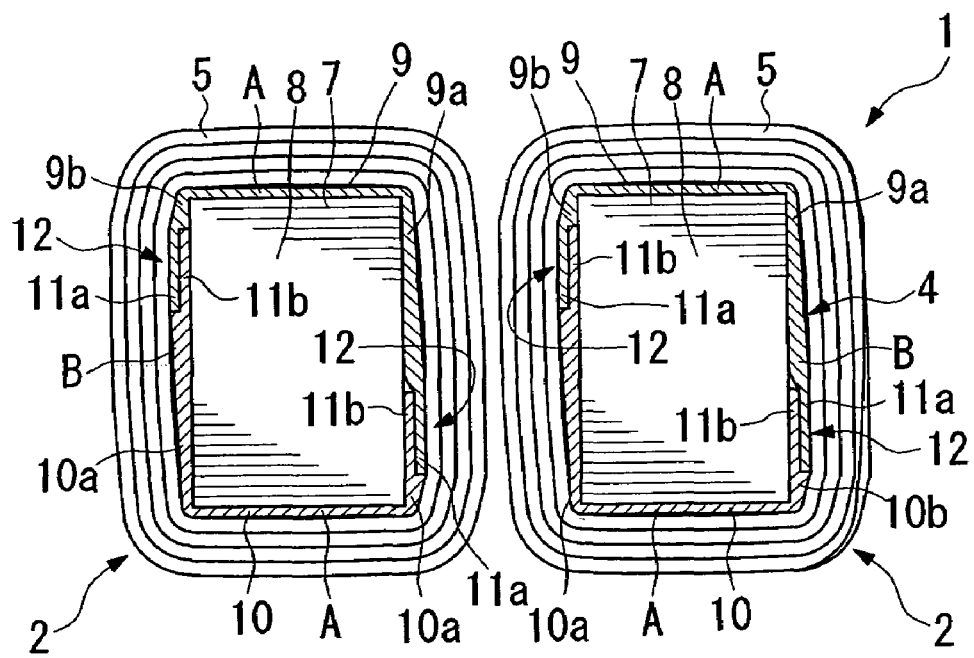
FIG. 3 is a sectional view diagrammatically showing adjoining stator units wound by coils respectively.

The coil 5 is wound about the insulating member 4 covering the magnetic tooth 8 described above. FIG. 3 diagrammatically shows the outline of the coil 5 wound about the insulating member 4, wherein the exterior of the coil 5 slightly projects in the circumferential direction of the magnetic tooth 8 in conformity with the thick portions 12 of the insulating member 4. This indicates that when observed as a whole, the stator unit 2 as a whole is formed roughly as a parallelogram slanted in one direction.

Next, a description will be given with respect to the relationship between the two adjacent stator units 2 that adjoin together with their side portions B. Herein, the side portions B of the adjoining stator units 2 arrange the thick portions 12, at which the engagement portions 11a and 11b engage with each other respectively, at different positions along the stacking directions of the magnetic steel sheets 7. That is, the thick portions 12, at which the coils 5 wound about the insulating members 4 slightly project in the width direction of the magnetic teeth 8, are mutually shifted from each other in position along the stacking directions of the magnetic steel sheets 7.

In the stator 1 of the present embodiment shown in FIG. 1, the adjoining stator units 2 arrange the coils 5 that are wound about the magnetic teeth 8 to be asymmetrically each other in the width direction, thus realizing different outlines of the coils 5 along the radial direction of the stator core 6. That is, the outline of one coil wound about one stator unit is made complementary to the outline of the other coil wound about the other stator unit.

Next, a description will be given with respect to the overall operation of the stator 1 of the present embodiment.

As described above, the stator 1 of the present embodiment is designed in such a way that each stator unit 2 arranges the thick portions 12, at which the engagement portions 11a and 11b of the insulating elements 9 and 10 respectively engage with each other, at the opposite side portions of the insulating member 4 covering the magnetic tooth 8. When arranging the stator units 2 to adjoin together with their side portions, one thick portion of one stator unit is shifted in position from the other thick portion of the other stator unit in the stacking directions of the magnetic steel sheets 7.

The conventional stator is designed in such a way that coils inevitably project at the same position in the stacking directions of the magnetic steel sheets between the adjoining stator units. Compared with the conventional stator, the present embodiment can secure a sufficiently large gap between coils wound about the adjoining stator units.

Specifically, the present embodiment allows the coil to be wound about the stator unit in a further length due to the provision of the relatively large gap secured between the adjoining stator units. When the stator of the present embodiment is designed for use in a motor, it is possible to further improve the torque. When the stator of the present embodiment is designed for use in a generator, it is possible to further improve electric power generation.

In the above, the coils are not necessarily increased in turns even though the present embodiment can allow a relatively large gap to be secured between the adjoining stator units. On the contrary, the stator can be modified in such a way that gaps between adjoining stator units are reduced to be identical to those of the conventional stator without increasing numbers of turns of coils. In this case, it is possible to reduce the diameter of the stator by reducing dimensions with respect to gaps between adjoining magnetic teeth, for example. That is, the present embodiment allows a motor or generator to be remarkably downsized while securing sufficient torque or electric power generation.

A rotating electrical machine is constituted using a rotor (not shown) that is rotatably and freely supported by the stator and is arranged opposite to the stator core with a prescribed gap therebetween. This rotating electrical machine using the stator of the present embodiment can produce higher torque or higher electric power compared with the conventional rotating electrical machine. Alternatively, this rotating electrical machine using the stator of the present embodiment can be downsized while securing the same torque or electrical power produced by the conventional rotating electrical machine.

In the stator 1 of the present embodiment, coils 5 are respectively wound about the magnetic teeth 8 in such a way that the outline of one coil of one magnetic tooth is substantially complementary to the outline of the other coil of the other magnetic tooth along the circumferential direction of the stator core 6, wherein these coils arranged opposite to each other and wound about adjacent magnetic teeth provide thick portions at different positions along the radial direction of the stator core 6, which matches the stacking direction of magnetic steel sheets 7. Therefore, even though the gap between the coils 5 of the adjacent stator units 2 is two times or less of the diameter of each coil, or if the gap is greater than the diameter of each coil, the present embodiment allows the coil 5 to be wound about the stator unit 2 by a further turn in that gap, or the present embodiment allows a further coil to be wound about the stator unit 2 in that gap. That is, the present embodiment can increase the number of turns of the coil 5 wound about the stator unit 2, thus further improving the space factor of the coil 5.

The present embodiment describes the stator 1 for use in the rotating electrical machine wherein a rotor (not shown) is arranged inside with prescribed gaps against plural magnetic teeth 8 projecting inwardly in the radial direction. Of course, this invention is not necessarily limited to the present embodiment. That is, the stator 1 of the present embodiment can be easily modified and applied to the other types of the rotating electrical machine in which a hollow rotor (not shown) having a cylinder-like shape is arranged outside with prescribed gaps against plural magnetic teeth projecting outwardly in the radial direction.

In order to enhance small projections realized by the thick portions 12 of the insulating member 4, the interconnection plates 9a and 9b are gradually reduced in thickness in the direction from the proximate areas of the engagement portions 11a to the base portion A of the insulating element 9, while the interconnection plates 10a and 10b are also gradually reduced in thickness in the direction from the proximate areas of the engagement portions 11b to the base portion A of the insulating element 10. Instead, it is possible to intermittently reduce the thickness of the interconnection plates 9a and 9b by steps, and it is possible to intermittently reduce the thickness of the interconnection plates 10a and 10b by steps.

The present embodiment provides the insulating member 4 having a square cylinder-like shape that consists of a pair of insulating elements 9 and 10 each having a square U-shape. Herein, the engagement portions 11a and 11b of the insulating elements 9 and 10 should be inevitably increased in thickness. In order to shift positions of the thick portions 12 in the stacking direction of the magnetic steel sheets 7 with respect to the side portions B of the insulating member 4, the engagement portions 11a and 11b are shifted from each other in positions along the stacking direction of the magnetic steel sheets 7 forming the magnetic tooth 8. Of course, this invention is not necessarily limited to the aforementioned structure of the insulating member 4 of the stator unit 2.

In other words, the insulating member 4 is not necessarily constituted by a pair of insulating elements 9 and 10, wherein the engagement portions 11a and 11b engage with each other to form the thick portions 12 at different positions along the side portions B of the insulating member 4. That is, the insulating member 4 can be constituted using a single integral cylinder, whereas the outlines of the coils 5 wound about the insulating members 4 covering the magnetic teeth 8 that are arranged to adjoin together are shifted with respect to each other in positions along the directly opposite side portions B of the adjoining magnetic teeth 8. Specifically, one insulating member is made thicker than the other insulating member at the prescribed position along the longitudinal direction of the core of the magnetic teeth 8 (i.e., the stacking direction of the magnetic steel sheets 7) and slightly projects in the circumferential direction of the stator 1, while the other insulating member is made thicker than one insulating member at the other position along the longitudinal direction of the core of the magnetic teeth 8 and slightly projects in the circumferential direction of the stator 1. Thus, it is possible to demonstrate the same effects even though the stator unit 2 is covered with a single integral insulating member having a cylinder-like shape.

According to the present embodiment, the stator 1 has a circular ring shape in which the prescribed number of stator units 2 are arranged in the circumferential direction. This invention is not necessarily limited to the aforementioned stator 1. That is, the stator can be constituted using a single integral stator core having a circular ring shape in which plural magnetic teeth project inwardly in the radial direction.

The present embodiment employs the magnetic teeth 8 each having a substantially recta shape in section, wherein by slightly changing dimensions in thickness of the insulating member 4 at the prescribed positions, projecting positions of the coil are deviated in the longitudinal direction of the core of the magnetic tooth 8. Instead, it is possible to arrange a deformed magnetic tooth, whose horizontal section matches a parallelogram slanted in one direction and which is contained in an insulating member. In that case, it is possible to provide the same effects of the present embodiment.

Next, a stator 20 will be described in accordance with the second embodiment of the invention with reference to FIG. 4, wherein parts identical to those of the stator 1 shown in FIG. 3 will be designated by the same reference numerals; hence, the description thereof will be omitted as necessary.

Figure 4:
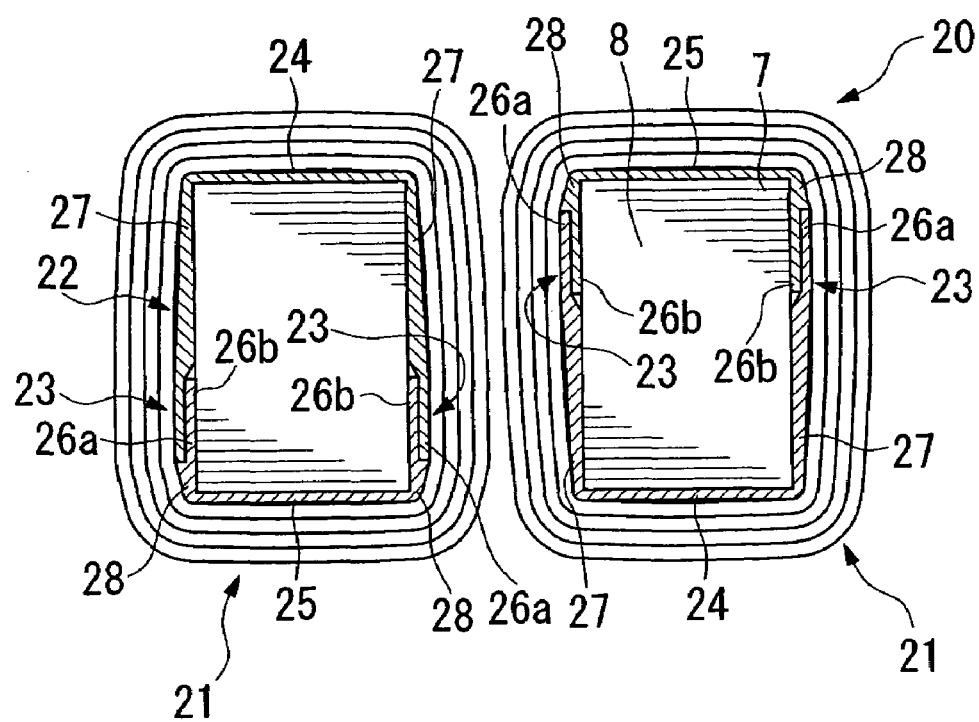
FIG. 4 is a sectional view diagrammatically showing adjoining stator units wound by coils in accordance with a second embodiment of the invention.

FIG. 4 shows a pair of adjoining stator units 21 that construct the stator 20 of the second embodiment, wherein the stator units 21 contain magnetic teeth 8 covered with insulating members 22 respectively. Like the stator 1 of the first embodiment, the stator 20 of the second embodiment is also designed in such a way that thick portions 23 are shifted with respect to each other in positions along the stacking directions of the magnetic steel sheets 7 with respect to opposite side surfaces of the stator units 21. In addition, the insulating member 22 consists of a pair of insulating elements 24 and 25, which are combined together with engagement portions 26a and 26b, thus forming the thick portions 23.

Unlike the stator 1 of the first embodiment, the stator 20 of the second embodiment is designed in such a way that with respect to each stator unit 21, both the thick portions 23 of the insulating member 22 are arranged at the same position or elevation along the stacking direction of the magnetic steel sheets 7. The insulating member 22 consists of a pair of insulating elements 24 and 25 each having a square U-shape, which differ from each other in size, wherein the insulating element 24 is enlarged compared with the insulating element 25. Specifically, the insulating element 24 has a pair of interconnection plates 27 having the same length, and the insulating element 25 has a pair of interconnection plates 28 having the same length, wherein each interconnection plate 27 is elongated compared with each interconnection plate 28.

According to the stator 20 of the second embodiment, the stator units 21 are alternately deflected in positions of the thick portions 23, at which the engagement portions 26a and 26b engage with each other, in such a way that one stator unit arranges the thick portions in one side while the other adjacent stator unit arranges the thick portions in the other side along with the stacking directions of the magnetic steel sheets 7 forming the magnetic teeth 8. That is, stator 20 corresponds to circumferential arrangement of the stator units 21, which are alternately turned upside down with respect to the positions of the thick portions 23. Similar to the stator 1 of the first embodiment, the stator 20 of the second embodiment can reliably secure sufficiently large gaps between the coils 5 wound about the magnetic teeth 8.

In short, it is possible to improve the space factor of the coil 5 with respect to each stator unit 21 of the stator 20 of the second embodiment similar to the stator 1 of the first embodiment, thus realizing improvement of the torque or electric power generation. Alternatively, it is possible to realize downsizing of the rotating electrical machine by reducing gaps between the magnetic teeth 8.

Of course, the second embodiment can be easily modified to have applicability to the other types of the rotating electrical machines, some of which were described in conjunction with the first embodiment. That is, the stator 20 of the second embodiment can be applied to the following types of the rotating electrical machines.

(i) The magnetic teeth project outwardly in the radial direction of the stator.

(ii) All the insulating members are embodied by a single integral insulating unit.

(iii) Each of the magnetic teeth is reshaped roughly in a trapezoidal shape in horizontal section thereof.

As described heretofore, this invention has a variety of effects and technical features, which will be described below.

(1) The stator of this invention allows the proximate distance between the coils wound about the adjoining magnetic teeth to be broadened as necessary, thus providing an extra space therebetween. This allows the coil to be wound about the magnetic tooth by a greater number of turns. Therefore, it is possible to improve the torque or electric power generation of the rotating electrical machine equipped with the stator of this invention. By arranging a greater number of stator units to be close to each other by eliminating the extra gaps therebetween, it is possible to downsize the rotating electrical machine while securing sufficient torque or electric power generation.

(2) By eliminating or reducing the extra gaps formed between the coils wound about the adjoining magnetic teeth, it is possible to improve the space factor with respect to each coil. Therefore, it is possible to further improve the torque or electric power generation of the rotating electrical machine equipped with the stator of this invention.

(3) The stator corresponds a circumferential arrangement of stator units, each of which contains a magnetic tooth covered with an insulating member. The insulating member has a square cylinder-like shape consisting of a pair of insulating elements each having a square U-shape in section. Specifically, interconnection plates of the paired insulating elements are mutually interconnected together to form thick portions, which slightly project outwardly in the circumferential direction of the magnetic tooth and which are arranged at different positions along the stacking direction of the magnetic steel sheets forming the magnetic tooth. Even though the insulating member is constituted by assembling together divided components, i.e., insulating elements, it is possible to secure satisfactory assembling performance with respect to each stator unit in which the magnetic tooth is covered with the insulating member consisting of the paired insulating elements. In addition, it is possible to improve the torque or electric power generation of the rotating electrical machine; and it is possible to downsize the rotating electrical machine using the stator of this invention.

(4) The rotating electrical machine of this invention can produce a high torque for a rotor by using a stator having a high space factor with respect to each coil. In addition, it is possible to produce high electric power generated by smooth and fast rotation of the rotor. Because of the high space factor, even though each coil having the same diameter is wound about the magnetic tooth by the same number of turns, it is possible to remarkably downsize the stator. This allows engineers to design rotating electrical machines each having a small size and weight, which may contribute to a noticeable reduction of installation spaces.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A stator for a revolving electrical machine, comprising:
   a stator core having a circular ring shape for arranging a plurality of magnetic teeth, which are arranged to adjoin together in a circumferential direction with prescribed gaps therebetween;
   a plurality of coils that are wound about the plurality of magnetic teeth respectively; and
   a plurality of insulating members each having a cylinder-like shape, which are interposed between the plurality of magnetic teeth and the plurality of coils respectively,
   wherein opposite sides of the insulating members are oppositely arranged to adjoin together, wherein said opposite sides respectively having a portion partially projected in the circumferential direction of the stator core, and are located at different positions, with respect to the stator teeth, in a longitudinal direction of the stator core.

2. The stator for a revolving electrical machine according to claim 1, wherein the coils are asymmetrically wound about the magnetic teeth adjoining together in such a way that outlines of the coils wound about the magnetic teeth, which are oppositely arranged to adjoin together, are made complementary to each other in a radial direction of the stator core.

3. The stator for a rotating electrical machine according to claim 1 or 2, wherein the insulating members each having a cylinder-like shape are each constituted by a pair of insulating elements each having roughly a square U-shape, each of which is constituted by a base portion covering a terminal surface of the stator core in the thickness direction, and a pair of interconnection plates having mutually different lengths that partially cover side surfaces extending from ends of the base portion in the thickness direction of the stator core, and wherein when the pair of insulating elements are combined together, the interconnection plates of the insulating elements oppositely arranged engage with each other to form thick portions) that are increased in thickness compared with other portions.

4. A rotating electrical machine comprising:
   a stator as defined in claim 1 or 2; and
   a rotor that is rotatably supported by the stator and is arranged opposite to the stator with a prescribed gap therebetween.

5. A rotating electrical machine comprising:
   a stator; and
   a rotor that is rotatably supported by the stator and is arranged opposite to the stator with a prescribed gap therebetween,
   wherein said stator comprises
      a plurality of stator units that are arranged to adjoin together in a circumferential direction of a stator core having a circular ring shape, wherein the plurality of stator units arrange a plurality of magnetic teeth that project inwardly in a radial direction of the stator core;
   a plurality of coils wound about the plurality of magnetic teeth respectively, and
   a plurality of insulating members, which cover the plurality of magnetic teeth respectively and about which the plurality of coils are wound,
   wherein each of the insulating members respectively having thick portions, said thick portions are arranged to substantially project oppositely with each other, and are shifted in positions in a longitudinal direction of the stator core.

6. A rotating electrical machine according to claim 5, wherein the coils are asymmetrically wound about the magnetic teeth adjoining together in such a way that outlines of the coils wound about the magnetic teeth, which are oppositely arranged to adjoin together, are made complementary to each other in a radial direction of the stator core.

7. The stator for a rotating electrical machine according to claim 1 or 2,
   wherein the insulating members each having a cylinder-like shape are each constituted by a pair of insulating elements each having roughly a square U-shape, each of which is constituted by a base portion covering a terminal surface of the stator core in the thickness direction, and a pair of interconnection plates having mutually different lengths that partially cover side surfaces extending from ends of the base portion in the thickness direction of the stator core, and wherein when the pair of insulating elements are combined together, the interconnection plates of the insulating elements oppositely arranged engage with each other to form thick portions that are increased in thickness compared with other portions.

8. A rotating electrical machine comprising:
   a stator as defined in claim 3, and
   a rotor that is rotatably supported by the stator and is arranged opposite to the stator with a prescribed gap therebetween.

* * * * *